Mar. 27, 1923.
J. G. DIFFENDAFFER.
RESTRAINING DEVICE.
FILED APR. 23, 1921.
1,449,502.
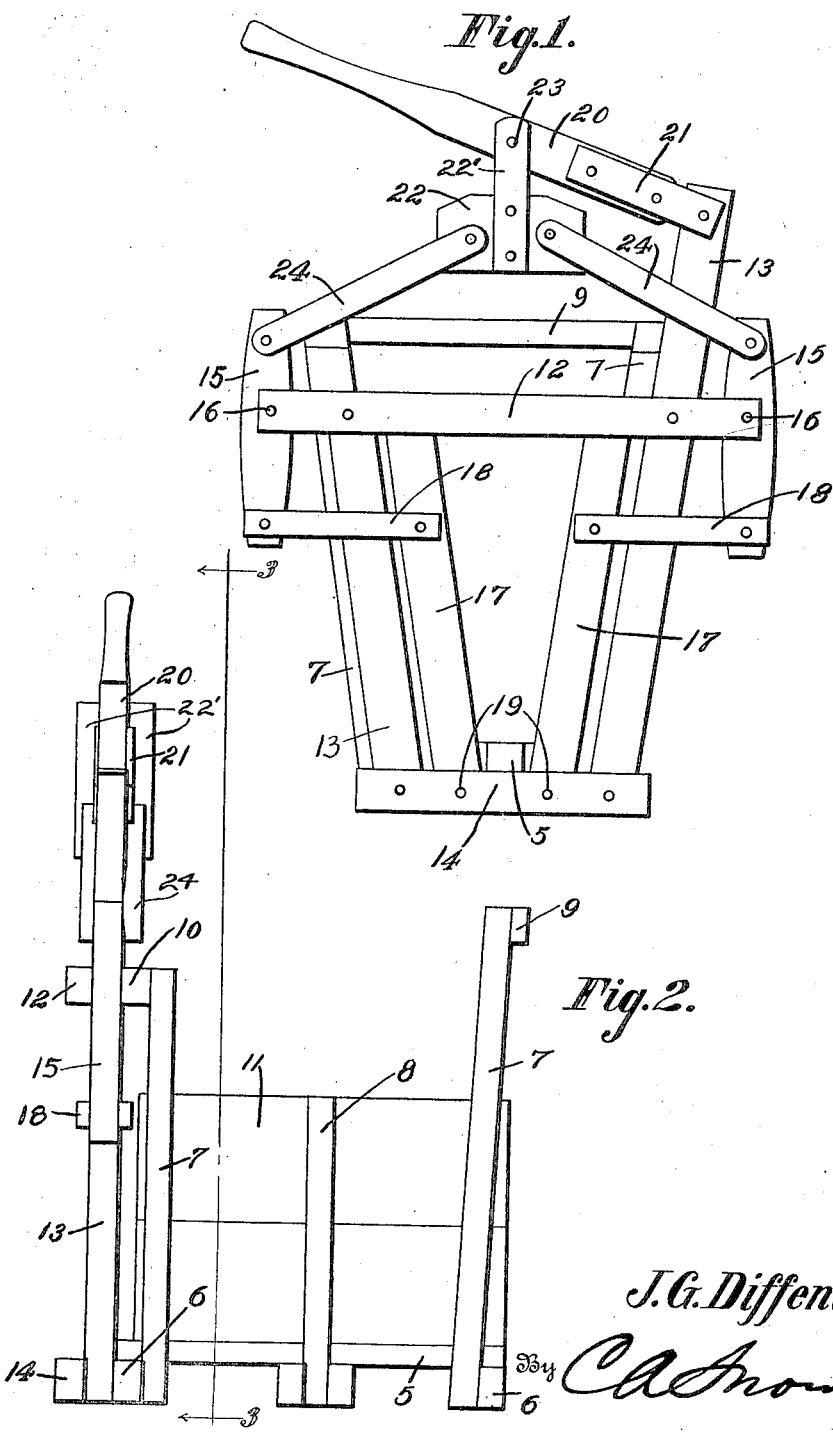
Inventor
J.G. Diffendaffer.
By C.A. Snow & Co.
Attorneys

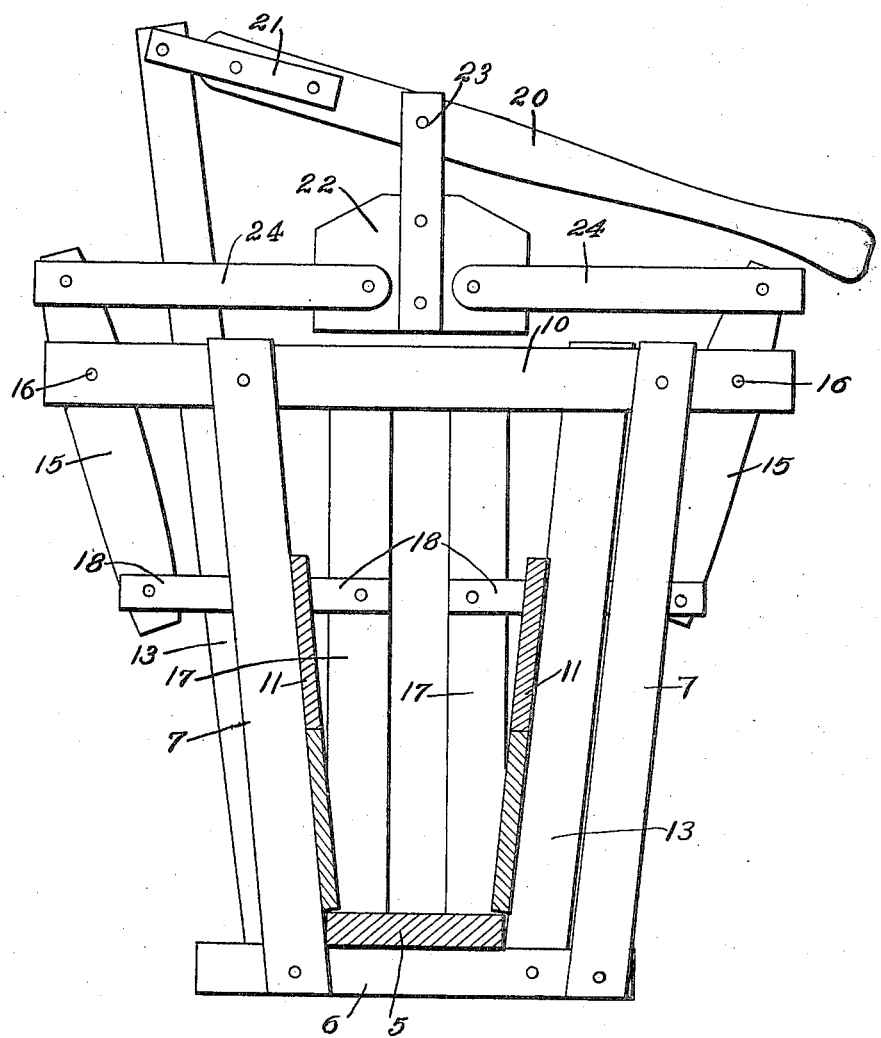

Patented Mar. 27, 1923.

1,449,502

UNITED STATES PATENT OFFICE.

JAMES G. DIFFENDAFFER, OF FERN, NEBRASKA.

RESTRAINING DEVICE.

Application filed April 23, 1921. Serial No. 464,011.

*To all whom it may concern:*

Be it known that I, JAMES G. DIFFENDAFFER, a citizen of the United States, residing at Fern, in the county of Cherry and State of Nebraska, have invented a new and useful Restraining Device, of which the following is a specification.

This invention has reference to devices designed for use in the care of live stock, and more particularly to a device known as a restraining device, it being the primary object of the invention to provide means for holding animals while they are being treated as by vaccinating, dehorning or the like.

A further object of the invention is to provide a device of this character which may be easily and readily operated by manual power and one in which the operating lever will be automatically held in a locked position.

With the foregoing and other objects in view which will appear as the description proceeds, the invention resides in the combination and arrangement of parts and in details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a front elevational view showing the stanchion forming a part of the invention as in an open position.

Figure 2 illustrates a side elevational view of the same.

Figure 3 illustrates a sectional view taken on line 3—3 of Figure 2.

Referring to the drawings in detail, the device includes a flooring 5 which is secured to the transversely extending supports 6, which support the flooring in spaced relation with the surface on which the device is positioned.

Having connection with the support 6 and extending upwardly therefrom, are the uprights 7 that are disposed at angles with respect to the flooring 5 so that the device will be wider at its upper portion than at its lower portion, to adapt the device to more comfortably accommodate an animal to be treated in the device.

The uprights 7 are disposed at the ends of the device and are relatively long as compared with the uprights 8, which are disposed intermediate the ends of the device, the uprights 7 being connected by means of the brace bars 9 and 10 respectively, so that the upper ends of the uprights will be held firmly against movement.

Secured to the uprights 7 and 8 are the side members 11 which are relatively wide and extend upwardly from the floor 5, the upper edge of the upper member 11 of each side of the device terminating in a plane flush with the upper edges of the central uprights 8.

Associated with the bar 10 is a bar 12, the bar 12 being disposed in spaced relation with the bar 10 and held in such spaced relation as by means of the standards 13, which are disposed between the bars 10 and 12 at points adjacent to the ends thereof and secured thereto in any suitable manner. The lower ends of the bars 13 are held stationary between the bars 6 and 14, there being provided a bolt or the like passing through the bars for securing the same together.

The ends of the bars 10 and 12 extend beyond the bars 13, where the same have pivotal connection with the vertical bars 15 which are pivoted between the bars 10 and 12 as by means of the bolt 16, the lower ends of the bars 15 having pivotal connection with the rails 17 forming the stanchion proper, as by means of the pivoted link members 18, the stanchion rail 17 being however pivotally supported between the bars 6 and 14, as at 19. The upper ends of the rails 17 move between the bars 10 and 12, which bars restrict movement of the rails 17 in predetermined directions, but permit of free movement thereof longitudinally of the bars 10 and 12 to accomplish the purpose of the invention.

One of the bars 13 is relatively long and has connection with the operating lever 20 as at 21, which operating lever has pivotal connection at 23 with the vertical bars 22' that are carried by the head 22 and as shown, this head has pivotal connection with the bars 15 as through the links 24, so that movement of the operating lever 20 will result in a relative movement of the bars 15 to cause the stanchion rails 17 to move with respect to each other.

From the foregoing it will be seen that an animal to be branded or treated, may be driven into the device and the animal's head positioned between the rails 17 of the stanchion.

The lever 20 is now operated to cause the rails to contact with the animal's neck to hold the animal against movement, it is obvious that when the lever 20 is moved to lock the stanchion, the lever falls to a position causing the links 24 to take positions in direct alignment with each other.

With the lever in this position, it will be seen that the same is automatically locked, and the rails 17 may only be moved by raising the lever 20 to a position as indicated in Figure 1.

Having thus described the invention, what is claimed as new is:—

In a device of the character described, a body portion, a stanchion disposed at one end of the body portion, said stanchion including stationary uprights, and movable uprights, end bars forming a part of the body portion and having their extremities disposed beyond the side walls of the body portion, vertical bars having pivotal connection with the end bar at one end of the body portion, link members having connection with the movable uprights, and having connection with the vertical bars, a handle having pivotal connection with the body portion, a head supported intermediate the ends of the handle, link members for connecting the head and upper ends of the vertical bars whereby movement of the handle will cause the vertical bars to move towards and away from each other.

In testimony that I claim the foregoing as my own, I have hereto affixed my signature in the presence of two witnesses.

JAMES G. DIFFENDAFFER.

Witnesses:
  D. M. SEARS,
  E. W. CLEMENTS.